(12) United States Patent
Yoon et al.

(10) Patent No.: US 12,455,997 B2
(45) Date of Patent: Oct. 28, 2025

(54) METHOD FOR GENERATING A LAYOUT OF AN INTEGRATED CIRCUIT

(71) Applicants: SK Hynix Inc., Icheon (KR); IUCF-HYU (Industry—University Cooperation Foundation Hanyang University), Seoul (KR)

(72) Inventors: Youngbog Yoon, Icheon (KR); Jaeduk Han, Seoul (KR)

(73) Assignees: SK Hynix Inc, Icheon (KR); IUCF-HYU (Industry-University Cooperation Foundation Hanyang University), Seoul (KR)

( * ) Notice: Subject to any disclaimer, the term of this patent is extended or adjusted under 35 U.S.C. 154(b) by 738 days.

(21) Appl. No.: 17/831,019

(22) Filed: Jun. 2, 2022

(65) Prior Publication Data

US 2023/0004703 A1 Jan. 5, 2023

(30) Foreign Application Priority Data

Jul. 1, 2021 (KR) .................. 10-2021-0086673

(51) Int. Cl.
*G06F 30/392* (2020.01)
*G06F 30/394* (2020.01)
(52) U.S. Cl.
CPC .......... *G06F 30/392* (2020.01); *G06F 30/394* (2020.01)
(58) Field of Classification Search
CPC ...... G06F 30/39; G06F 30/392; G06F 30/394; H10D 84/975; H10D 89/10
USPC ......................................................... 716/119
See application file for complete search history.

(56) References Cited

U.S. PATENT DOCUMENTS

| 5,351,197 | A | 9/1994 | Upton et al. | |
|---|---|---|---|---|
| 2003/0051217 | A1* | 3/2003 | Cheng | G06F 30/394 716/115 |
| 2009/0083689 | A1* | 3/2009 | Ringe | G06F 30/394 716/126 |
| 2011/0055791 | A1* | 3/2011 | Gao | G06F 30/392 716/126 |
| 2017/0316136 | A1 | 11/2017 | Pontius | |

FOREIGN PATENT DOCUMENTS

| KR | 20160047380 A | 5/2016 |
|---|---|---|
| KR | 10-2017-0115165 A | 10/2017 |

OTHER PUBLICATIONS

A. Loke et al., "Analog/Mixed-Signal Design Challenges in 7-nm CMOS and Beyond," Custom Integrated Circuits Conf. (CICC), 2018.

B. Ren et al., "A domain-specific cell based ASIC design methodology for digital signal processing applications," Proceedings Design, Automation and Test in Europe Conference and Exhibition, 2004.

(Continued)

*Primary Examiner* — Paul Dinh (57) ABSTRACT

Generating a layout of an integrated circuit having a plurality of components may be performed by generating placement information of the plurality of components; generating pin position information for pins of the plurality of components; generating grid information according to the pin position information; and generating routing information between two pins of the plurality of components using the grid information.

12 Claims, 8 Drawing Sheets

(56) References Cited

OTHER PUBLICATIONS

E. Chang et al., "BAG2: A process-portable framework for generator based AMS circuit design," IEEE Custom Integrated Circuits Conference (CICC), 2018.
H. Mathias et al., "Automatic layout generation for CMOS analog transistors," Proceedings of the conference on European design automation (Euro—DAC '94), 1994.

* cited by examiner

```
M7:
    type: 'Tr'
    instname: 'M7'
    cellname: 'PMOS'
    orient: 'R0'
    inNum: 1
    nseries: 1
    pseries: 1
    height_p: *height_p
    w: 240
    l: 100
    nf: 100
    unfix_m: False
    blcSepGateP: *mcgs
    ExtendGate: True
    GateOffset: 0
    exGateOffset: *exGateOffset
    inGateOffset:
. . . .
```

```
Load PCell configuration file
params = load_param('cell.yaml')

Generate layout and routing objects
pnr = load_pnr(design=dsn, flavor=' type ' , techlib='techlib ' , schlib='schlib ' ,
viewname=' schematic ' )

Update device parameters
params = pnr.parameter_update(params)

Load instances
pnr.load_instance(templates, params)

Place instances
pnr.pplace(grid=pg, inst='ND0', xy=[guardoffset+activeSp*1,0])
pnr.rplace(grid=pg, inst='ND2', rinst='ND0', direction='R', xoffset = activeSp)
pnr.rplace(grid=pg, inst='ND1', rinst='ND2', direction='L', xoffset = activeSp)

Routing
pnr.route_pin(grid=gf01, pins=pnr.getInstTerms('Q'), htrack =
gf01.mn.center(pnr.getInstPins('ND0', 'OUT')[0])[1] )
```

METHOD FOR GENERATING A LAYOUT OF AN INTEGRATED CIRCUIT

CROSS-REFERENCE TO RELATED APPLICATION

The present application claims priority under 35 U.S.C. § 119(a) to Korean Patent Application No. 10-2021-0086673, filed on Jul. 1, 2021, which is incorporated herein by reference in its entirety.

BACKGROUND

1. Technical Field

Various embodiments generally relate to a method for generating a layout of an integrated circuit.

2. Related Art

As the structure of integrated circuits becomes more complex, cell-based methodologies that abstract design rules and reuse basic cells are being used.

That is, when a library for cells included in an integrated circuit is generated during the design process of the integrated circuit and the integrated circuit is implemented using the generated library, the time and cost required for design and implementation of the integrated circuit may be advantageously reduced.

However, application of the cell-based methodology may be limited when there are severe limitations in circuit area or routing rules.

For example, a Dynamic Random Access Memory (DRAM) integrated circuit may have severe limitations in area and routing for a peripheral circuit area in order to secure a larger area for the memory cells of the DRAM.

For another example, logic circuits may not be able to use one standard library of cells to meet area and routing conditions, and may have to perform layout by actively customizing the library of cells.

Accordingly, a layout may have to be newly generated even for a circuit that performs the same function, and as a result the layout cost of the integrated circuit increases and productivity decreases.

SUMMARY

In accordance with an embodiment of the present disclosure, a method for generating a layout of an integrated circuit having a plurality of components may include determining placement information of the plurality of components; determining pin position information for pins of the plurality of components; generating grid information according to the pin position information; and generating routing information between two of the pins of the plurality of components using the grid information.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate various embodiments, and explain various principles and advantages of those embodiments.

DETAILED DESCRIPTION

The following detailed description references the accompanying figures in describing illustrative embodiments consistent with this disclosure. The embodiments are provided for illustrative purposes and are not exhaustive. Additional embodiments not explicitly illustrated or described are possible. Further, modifications can be made to presented embodiments within the scope of teachings of the present disclosure. The detailed description is not meant to limit this disclosure. Rather, the scope of the present disclosure is defined in accordance with claims and equivalents thereof. Also, throughout the specification, reference to "an embodiment" or the like is not necessarily to only one embodiment, and different references to any such phrase are not necessarily to the same embodiment(s).

Figure 1:
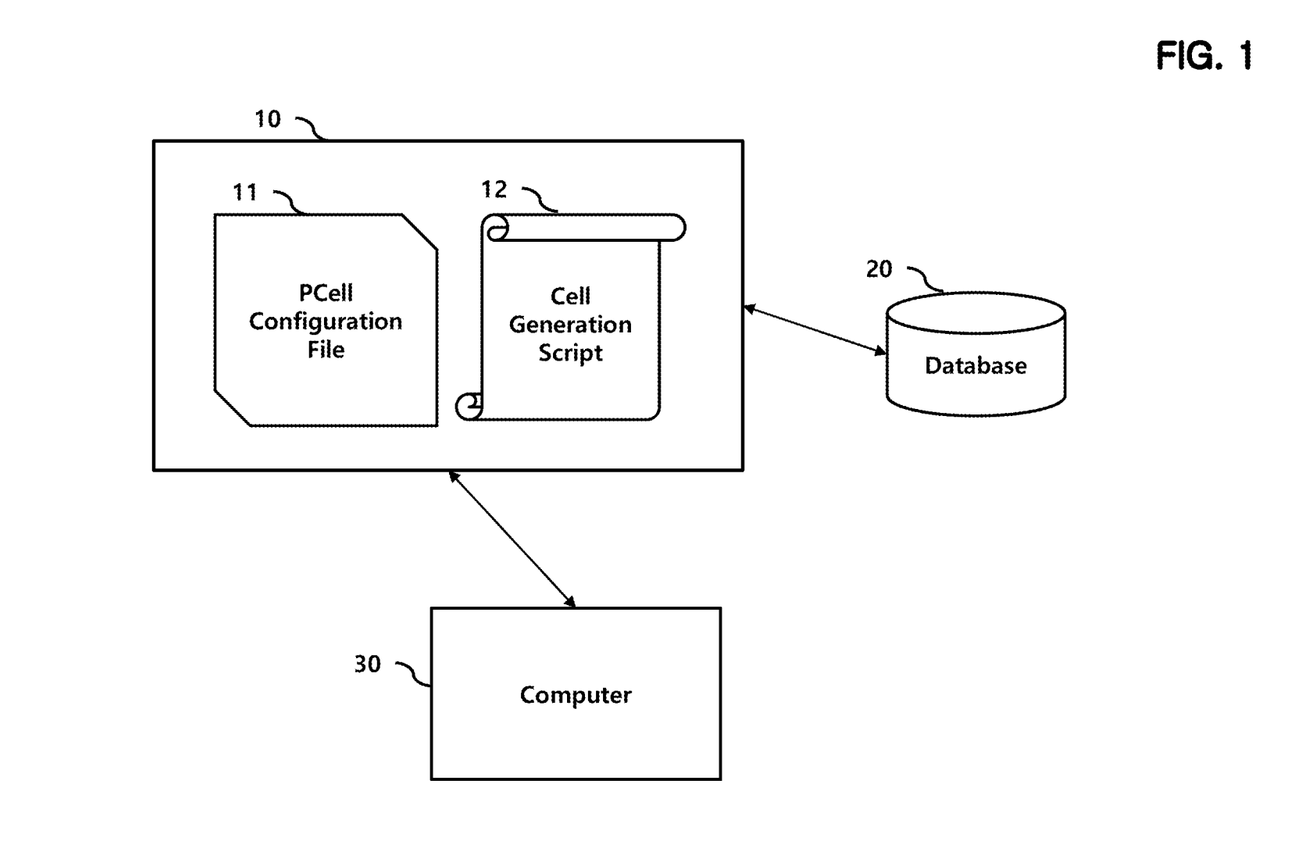
FIG. 1 illustrates a system for generating a layout according to an embodiment of the present disclosure.

FIG. 1 is a block diagram illustrating a system for generating a layout according to an embodiment of the present disclosure.

The system includes a database 20 for storing cell layout information 10 and a computer 30 for generating a layout using the cell layout information 10.

The computer 30 may generate the cell layout information 10 and add it to the database 20 or update the cell layout information 10 stored in the database 20.

In general, an integrated circuit may be made by combining a plurality of components.

For example, a logic circuit such as an XNOR gate may be made as an integrated circuit comprising a plurality of transistors.

As another example, a command decoder of a Dynamic Random Access Memory (DRAM) comprises a plurality of transistors connected in a desirable manner to perform the function(s) of the command decoder.

In illustrative embodiments of this disclosure, an XNOR gate or a command decoder may correspond to an integrated circuit or a cell within an integrated circuit, and a transistor may correspond to a parameterized cell (PCell).

A PCell is a conceptual component commonly used in electronic design automation (EDA) technology, and describes, for example, structure of a component used in a circuit using one or more parameters.

Information about a plurality of transistors, i.e., a plurality of PCells, is stored in the PCell configuration file 11 and information for deploying a plurality of PCells and connecting or routing them is described in the cell generation script 12.

The PCell configuration file 11 collects and stores information regarding a plurality of PCells included in a cell, and may be referred to as a device configuration file 11.

The cell layout information 10 corresponding to one integrated circuit may be stored in the database 20.

When the layout of the integrated circuit needs to be changed according to a change in process technology, a part in the previously generated cell layout information 10 that needs to be corrected to account for the change in process technology may be updated.

Figure 2:
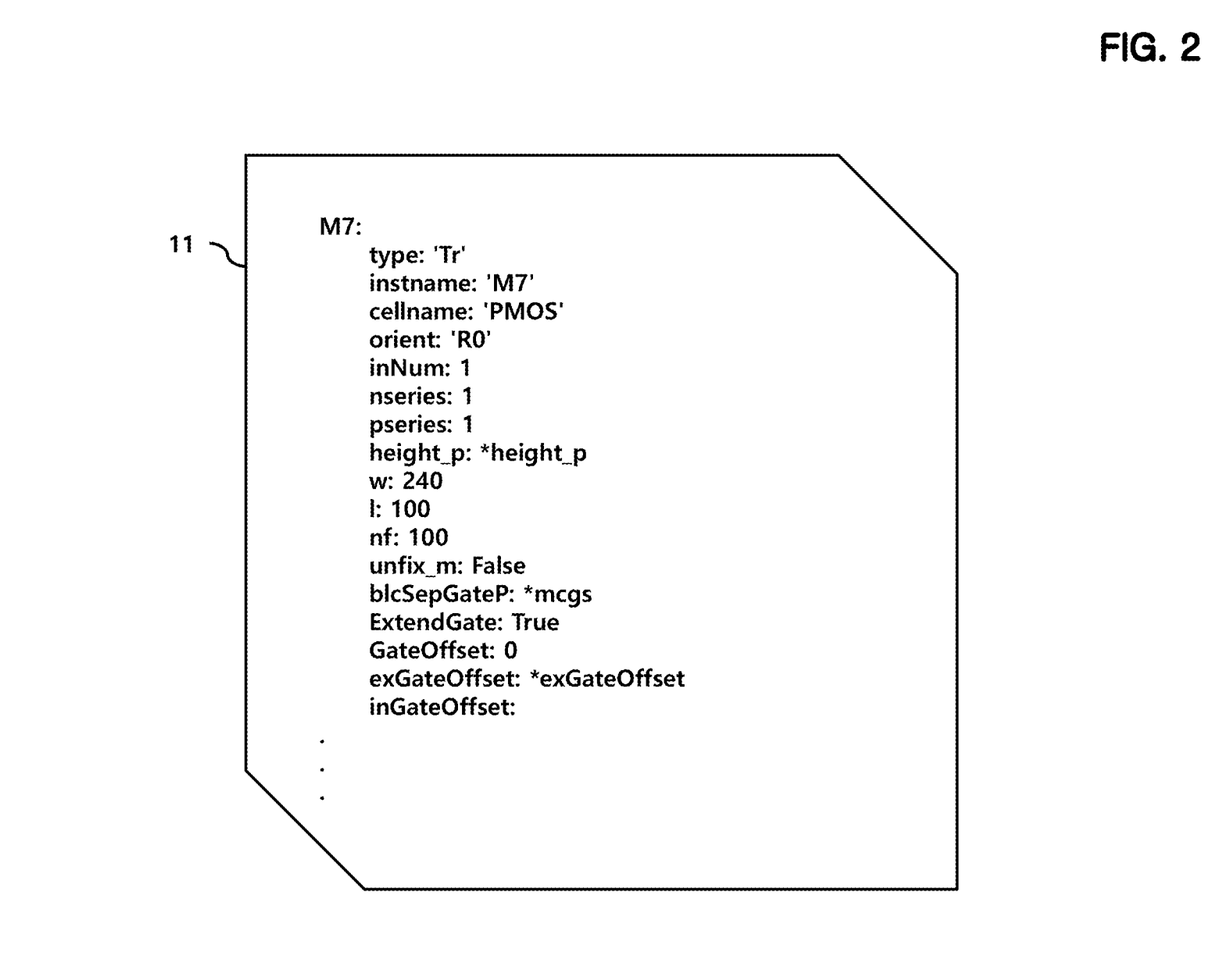
FIG. 2 illustrates a PCell configuration file according to an embodiment of the present disclosure.

FIG. 2 is an example of PCell information included in the PCell configuration file 11.

The PCell information of FIG. 2 relates to a transistor named M7, and stores physical parameters and design parameters thereof.

For example, the physical parameters may correspond to information such as height, width, length, and positions of each of one or more gates, one or more sources, and one or more drains of the transistor M7, and the design parameters may correspond to respective shapes of the gates, sources, and drains.

The gates, sources, and drains may be referred to as pins below. More generally, a pin may refer to any point within a PCell to which a connection may be made from outside the PCell.

In the related arts, the PCell information is specific to a process technology, and if the process technology is changed, numerical values of the parameters included in the PCell information may change.

But in embodiments of the present disclosure, the physical parameters and design parameters included in the PCell information may be described in an abstract form so as not to be dependent on a specific process technology.

For example, information such as height, width, length, and position may be described in terms of a relative length or a relative coordinate value, rather than being specified as a specific value.

Figure 3:
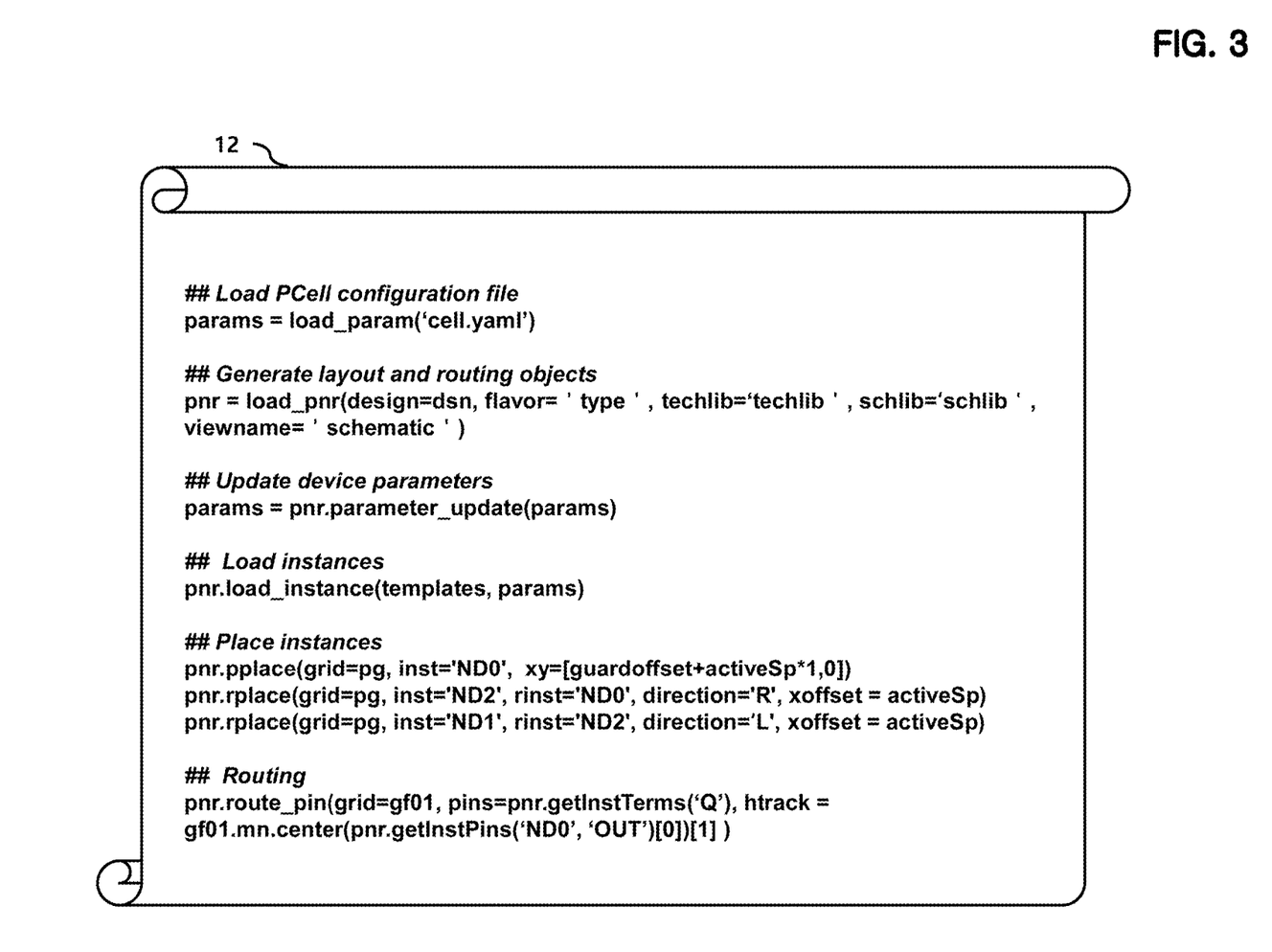
FIG. 3 illustrates a cell generating script according to an embodiment of the present disclosure.

In embodiments, the cell generation script 12 can generate information such as specific length and position corresponding to a process technology by decoding the abstracted length and position information according to the process technology with reference to the process technology parameters.

The process technology parameters are information required when manufacturing a semiconductor device by applying a layout of an integrated circuit to an actual process, and the process technology parameters may be provided in advance.

The technology of abstracting the process technology parameters included in the PCell configuration file 11 and decoding it in the cell generation script 12 is known through previous articles such as r E. Chang et al., "BAG2: A process-portable framework for generator based AMS circuit design," IEEE Custom Integrated Circuits Conference (CICC), 2018., and a detailed description thereof will be omitted.

The cell generation script 12 includes one or more placement commands describing how to place a plurality of PCells and a routing command corresponding to a connection procedure for the plurality of PCells.

The computer 30 may generate the layout of a corresponding integrated circuit by executing the cell generation script 12.

The computer 30 may generate a layout for a larger circuit generated with combinations of smaller integrated circuits by executing cell generation scripts 12 for the smaller integrated circuits.

For example, a layout of a DRAM may be generated by generating cell layout information for a command decoder, an address buffer, a data buffer, a sense amplifier, etc. included in the DRAM and executing cell generation scripts corresponding thereto.

In this case, the computer 30 may use higher-level script related to the placement and routing of smaller integrated circuits.

Since the higher-level script is an extension of the cell generation script 12, a person skilled in the art can easily recognize it from the disclosure of the present invention.

FIG. 3 is software code illustrating an example of a cell generation script 12.

The code of FIG. 3 is for illustration, and detailed descriptions of names and variables of each code are omitted, and the function of each code will be mainly described with reference to the comments.

The cell generation script 12 loads the PCell configuration file 11, generates a placement (i.e., layout) and routing object, updates device parameters, and loads an instance, which corresponds to a preparation operation for executing placement and routing operation in the cell generation script 12. The instance represents a corresponding PCell.

In the illustrated embodiment, a library techlib including process technology parameters is used to perform generation of a placement and routing object, and specific information corresponding to a process technology can be generated and used during the placement and routing operations.

The cell generation script 12 includes a plurality of placement commands and a routing command.

When an integrated circuit has a multi-layered structure, the placement commands and the routing commands may be performed layer by layer.

The number of placement commands and routing commands may depend on the number of PCells in the integrated circuit.

The 'Place instances' portion of FIG. 3 describes an operation of placing instances ND0, ND1, and ND2.

The placement commands include a first placement command that specifies a position of ND0, a second placement command that places ND2 to the right of ND0, and a third placement command that finally places ND1 to the left of ND2.

In the first placement command, a reference coordinate for placing the instance ND0 may be specified, and in the second and third placement commands, the horizontal distance from adjacent instances may be described together.

As discussed above, multiple layers may be used for fabricating an integrated circuit.

In embodiments of the present disclosure, a dynamic grid can be set for each layer, and accordingly, a layer can be specified using a variable representing a position on the dynamic grid.

In FIG. 3, the placement command and the routing command receive a variable representing a grid in order to specify a layer.

Conventionally, when using a grid corresponding to a layer, a static grid in which regular intervals are fixedly provided (like on a grid paper) is used.

Such a static grid may not be suitable for use in environments such as a DRAM where a variety of standard transistors are used or where routing is complicated.

In the present disclosure, the layout is performed based on a dynamic grid by generating a dynamic grid in which intervals are set in various ways based on pin positions included in the PCell information, without using a static grid.

This will be described in detail again below.

The cell generation script 12 completes routing operations between PCells through routing commands.

An example of an abstract routing command is as follows.
"connect 'G' pin of inst A to 'D' pin of inst B using grid A"

This routing command specifies connecting a gate pin G of instance A to a drain pin D of instance B on grid A.

Although FIG. 3 includes only one routing command, a layout may be completed by executing a plurality of routing commands even on one layer.

In FIG. 3, use of a placement command and a routing command to generate a layout of an integrated circuit is illustrated, but a detailed layout generating procedure performed in the background is not disclosed.

Figure 4:
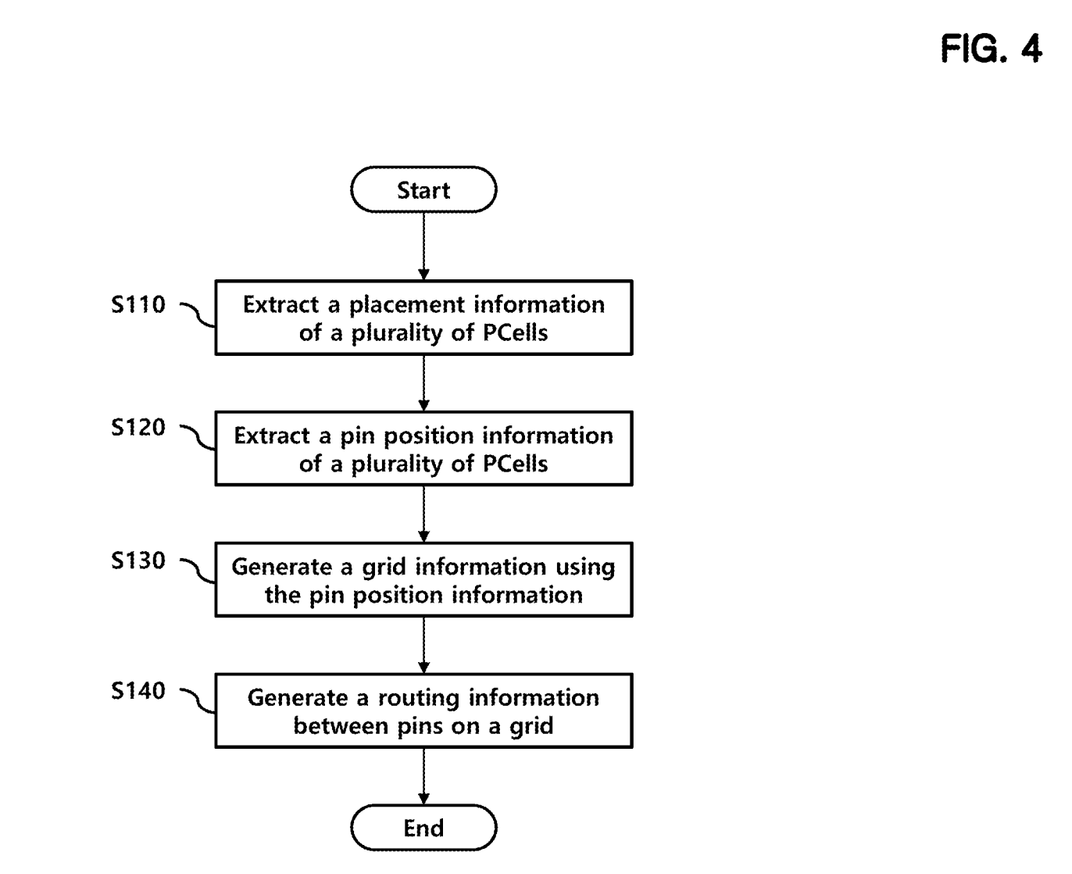
FIG. 4 is a flowchart showing a procedure for generating a layout of an integrated circuit according to an embodiment of the present disclosure.

FIG. 4 is a flowchart illustrating a procedure for generating a layout according to an embodiment of the present disclosure.

Hereinafter, the procedure of FIG. 4 will be described with reference to the layout drawings of FIGS. 5A to 8.

Figure 5A:
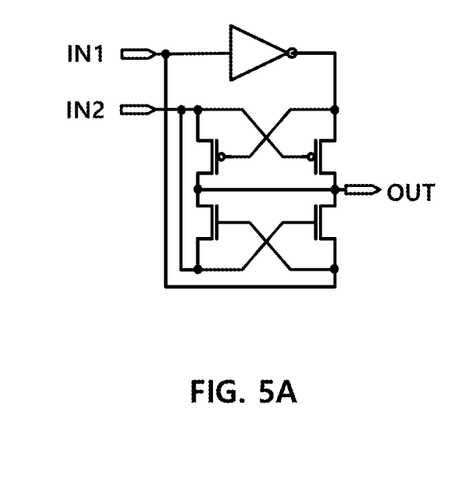
FIGS. 5A and 5B illustrate a circuit diagram and a layout of an XNOR gate.
Figure 5B:
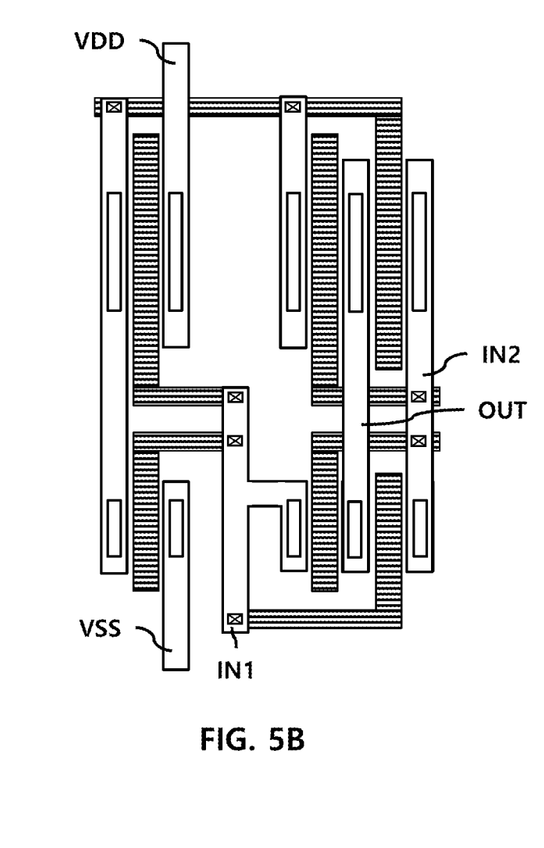

FIG. 5A is a circuit diagram of an XNOR gate and FIG. 5B is a layout diagram corresponding to FIG. 5A, and FIGS. 6 to 8 are diagrams for explaining a procedure for generating a layout of the XNOR gate. Elements of FIG. 5A may be understood with reference to the description provided with respect to FIG. 6.

The XNOR gate may correspond to an integrated circuit or to one of a plurality of cells in the integrated circuit, as described above.

The procedure of FIG. 4 may be performed while the cell generation script 12 is executed in the computer 30.

First, the placement information of a plurality of PCells is extracted at S110.

As described above, the placement information of a plurality of PCells can be known by analyzing a plurality of placement commands included in the cell generation script 12.

Next, pin position information of each of the plurality of PCells is extracted at S120.

The pin position information may correspond to positions of a source, a drain, and a gate of a transistor in each of the PCells and may be stored in the PCell configuration file 11 as part of the PCell information.

Next, grid information is generated using the pin position information at S130.

For example, each coordinate of a horizontal grid and a vertical grid included in grid information corresponds to a pin position, and the actual distance between horizontal and vertical grids is not fixed to a constant value.

Figure 6:
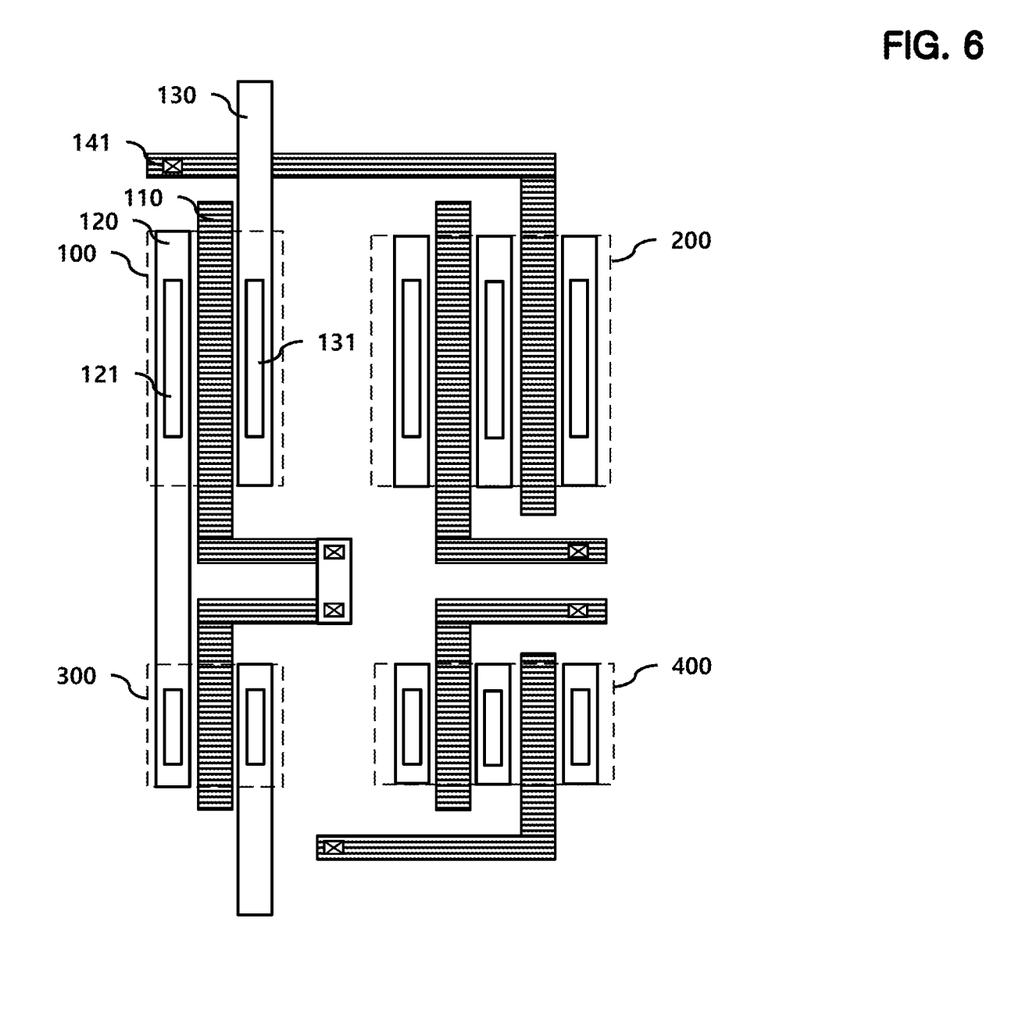
FIGS. 6 to 8 illustrate a procedure for generating a layout of an XNOR gate according to an embodiment of the present disclosure.

FIG. 6 is a layout diagram of a state in which a routing operation is partially completed after a plurality of PCells 100, 200, 300, and 400 are placed. In the illustrated example, the first PCell 100 corresponds to an upper transistor (for example, a p-channel Metal Oxide Semiconductor Field Effect Transistor (MOSFET)) of the inverter shown in FIG. 5A, the third PCell 300 corresponds to a lower transistor (for example, an n-channel MOSFET) of the inverter shown in FIG. 5A, the second PCell 200 corresponds to the two p-channel MOSFETs shown in FIG. 5A, and the fourth PCell 400 corresponds to the two n-channel MOSFETs shown in FIG. 5A.

As described above, a number of routing commands may be performed to complete the routing operation.

Before the routing commands are performed, routing paths do not exist between the plurality of PCells and each is separated from the others.

FIG. 6 illustrates a state in which the plurality of PCells are partially connected, and may be viewed as a state in which some of a plurality of routing commands have been performed.

In FIG. 6, a rectangle 110 with the horizontal pattern represents a gate line positioned in a gate layer or a routing path connected to the gate line.

In FIG. 6, rectangles 120 and 130 with no pattern therein represent metal lines 120 and 130 positioned in a first metal layer or routing paths connected to those metal lines.

FIG. 6 also illustrates a source contact pattern 121, a drain contact pattern 131, and a via pattern 141.

Figure 7:
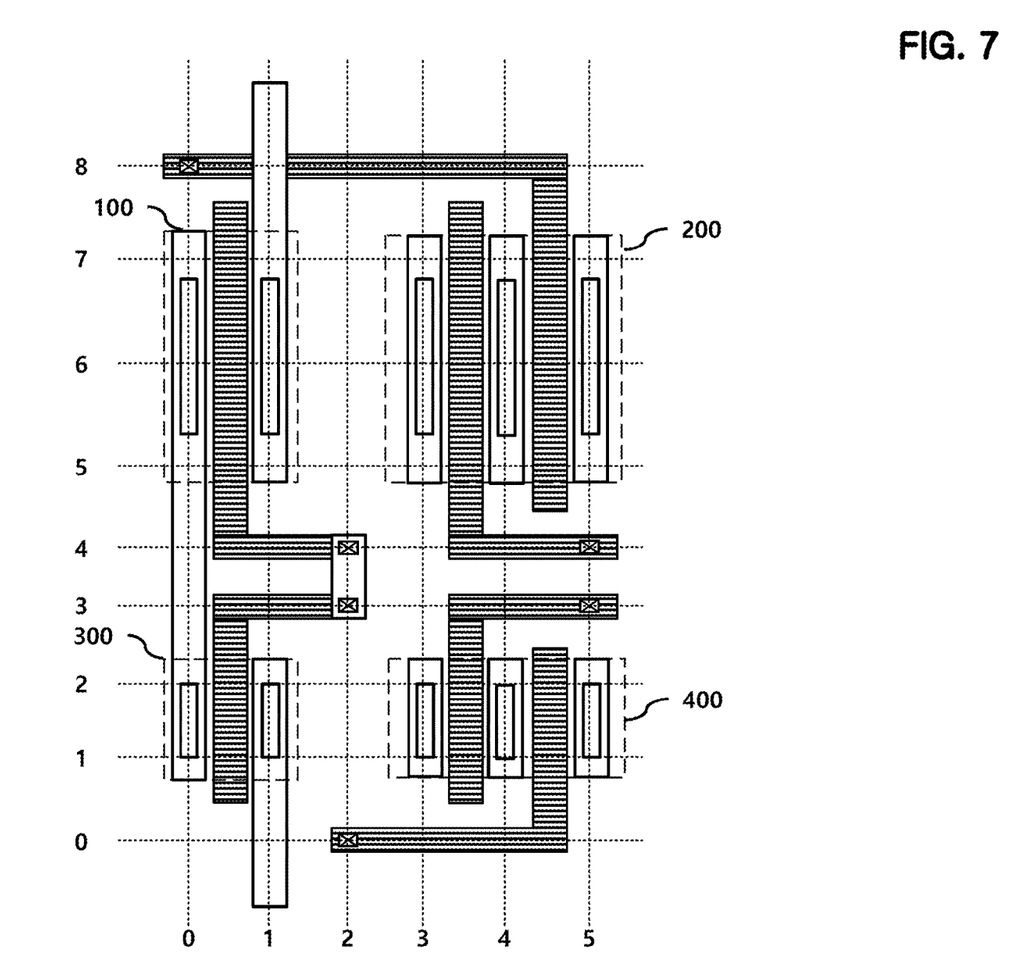

FIG. 7 shows a state in which horizontal and vertical grids have been added based on the pin position information identified in FIG. 6.

The horizontal and vertical grids included in the grid information correspond to pin positions. That is, within a range of horizontal grid lines that include all the pins, at least one pin position is located at each of the horizontal grid lines; within a range of vertical grid lines that include all the pins, at least one pin position is located at each of the vertical grid lines, and all of the pin positions are located on a corresponding horizontal grid line and on a corresponding vertical grid line.

Accordingly, a position of each pin can be indicated by a coordinate corresponding to a horizontal grid line and a vertical grid line.

As described above, the actual distance between horizontal grids or between vertical grids is not fixed to a constant value.

For example, the actual distance between horizontal grid lines 0 and 1 and the actual distance between horizontal grid lines 1 and 2 may be different from each other.

As described above, the grid may be dynamically generated for each layer, and a distance between adjacent lines in each of the grids is not fixed to a constant value.

A routing operation is performed layer by layer, and when connection of wirings located in different layers are required, via contacts may be added.

Accordingly, when a grid corresponding to a layer is generated, pin positions of adjacent layers may be additionally referenced. That is, a grid information corresponding to one layer may additionally include grid information corresponding to pin positions of adjacent layers.

Grid information may be generated while a routing command is being executed, or may be generated in advance for all layers.

Figure 8:
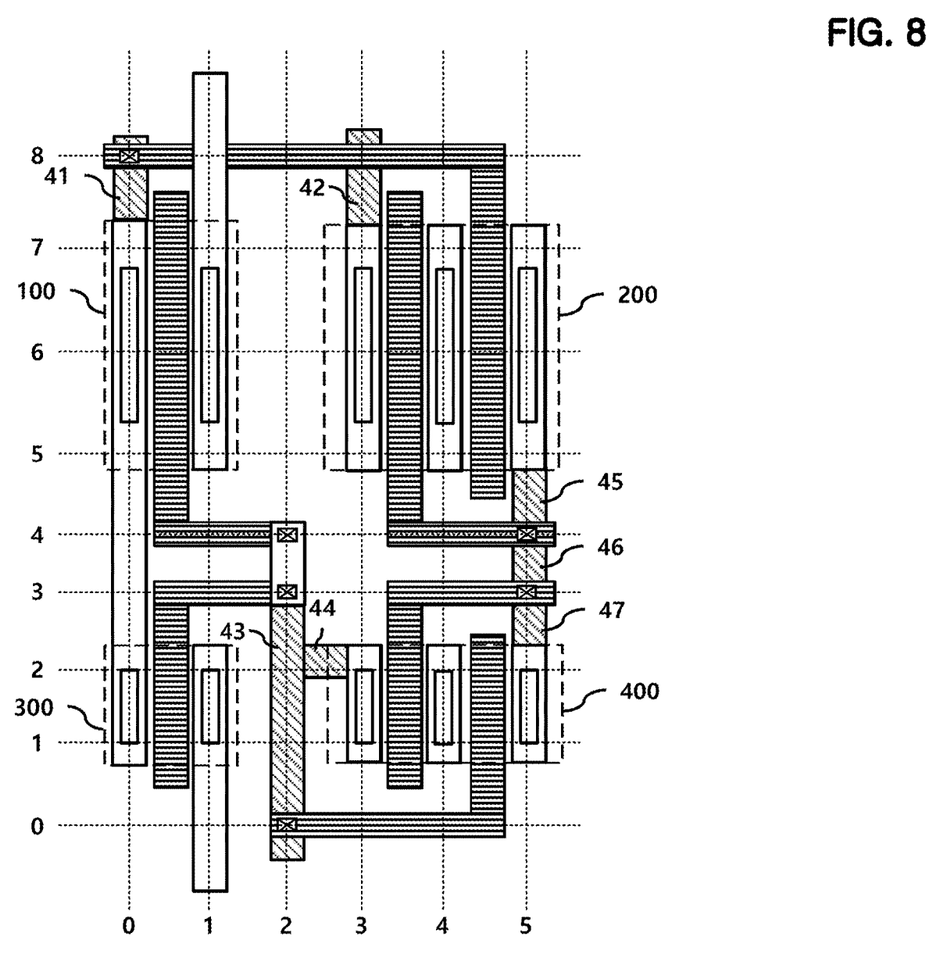

Grids indicated by dotted lines in FIGS. 7 and 8 illustrates grids generated for a routing operation for connecting a gate layer (represented by rectangles having a horizontal pattern) and a metal layer (represented by rectangles having no pattern).

After the grid information is generated, routing information between pins is generated on the corresponding grid at S140.

In the present embodiment, routing can be performed more efficiently for circuits having a complex structure because routing paths are generated by using a dynamic grid generated based on pin positions rather than a static grid having a constant fixed interval.

For example, by specifying coordinates of two pins in a routing command, routing along the grid can be easily performed.

FIG. 8 is a layout diagram illustrating additional routing paths 41 to 47 provided by routing commands performed after the state illustrated in FIG. 7.

Additional routing paths 41 to 47 are present in the first metal layer and diagonal patterns are added for identification.

As FIG. 8 illustrates, the additional routing paths 41 to 47 are all located on the dynamic grid.

For example, in the case of the additional routing path 41, it can be generated by providing a routing command connecting a pin located on the coordinate (0, 7) and a pin located on the coordinate (0, 8).

As described above, in the present embodiment, grid information is not generated based on an actual physical length, but based on the position of one or more pins in the cells for which routing is being performed.

In the layout generation process, grid information is converted into actual physical length by referring to process technology parameters, so the grid interval can be dynamically changed according to process technology.

As described above, in embodiments of the present disclosure, when PCell information is updated according to a change in process technology, the existing placement commands and routing commands can be used as they are, which simplifies the layout generation process.

Although various embodiments have been illustrated and described, various changes and modifications may be made to the described embodiments without departing from the spirit and scope of the invention as defined by the following claims.

What is claimed is:

1. A method for generating a layout of an integrated circuit having a plurality of components, the method comprising:
    loading cell layout information including placement information of the plurality of components and pin position information for the pins of the plurality of components;
    determining the placement information of the plurality of components;
    determining the pin position information for the pins of the plurality of components;
    generating grid information according to the pin position information; and
    generating routing information between two of the pins of the plurality of components using the grid information,
    wherein determining the placement information comprises extracting the placement information from the cell layout information, and
    wherein determining the pin position information comprises extracting the pin position information for the pins of the plurality of components from the cell layout information.

2. The method of claim 1, wherein loading the cell layout information includes:
    searching the cell layout information in a database; and
    loading the cell layout information when the cell layout information exists in the database or generating the cell layout information when the cell layout information does not exist in the database.

3. The method of claim 2, further comprising:
    updating the cell layout information according to a process technology in the database.

4. The method of claim 1, wherein the cell layout information includes a routing command to generate routing information with reference to the pin position information for the pins of the plurality of components and a placement command representing the placement information of the plurality of components.

5. The method of claim 4, wherein the cell layout information includes a component configuration file storing the pin position information for the pins of the plurality of components and a cell generation script storing the placement command and the routing command.

6. The method of claim 4, wherein the pin position information for the pins of the plurality of components is independent from process technology.

7. The method of claim 6, wherein extracting the pin position information includes decoding the pin position information included in the cell layout information using parameters corresponding to a process technology.

8. The method of claim 1, wherein the integrated circuit includes a plurality of layers, and
    wherein generating the grid information includes generating respective grid information corresponding to one layer of the plurality of layers.

9. The method of claim 8, wherein generating the respective grid information corresponding to the one layer includes:
    generating grid information corresponding to pin position information of one or more pins included in the one layer; and
    generating grid information corresponding to pin position information of one or more pins included in a layer adjacent to the one layer.

10. The method of claim 1, wherein generating the grid information includes:
    generating horizontal grid information corresponding to the pin position information; and
    generating vertical grid information corresponding to the pin position information.

11. The method of claim 1, wherein generating routing information includes connecting a coordinate where a pin is located and a coordinate where another pin is located.

12. The method of claim 1, wherein the grid information defines:
    a plurality of horizontal grid lines each corresponding to at least one pin of the plurality of components, and
    a plurality of vertical grid lines each corresponding to at least one pin of the plurality of components;
    and each of the two of the pins of the plurality of components is located at a corresponding one of the intersections of the horizontal grid lines and the vertical grid lines.

* * * * *